United States Patent
Delgado et al.

(10) Patent No.: US 8,834,642 B2
(45) Date of Patent: Sep. 16, 2014

(54) DISHWASHER WITH MULTIPLE TREATING CHAMBERS

(71) Applicant: Whirlpool Corporation, Benton Harbor, MI (US)

(72) Inventors: Kristopher L. Delgado, Stevensville, MI (US); Jordan R. Fountain, San Francisco, CA (US); Barry E. Tuller, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 9 days.

(21) Appl. No.: 13/771,190

(22) Filed: Feb. 20, 2013

(65) Prior Publication Data

US 2013/0160799 A1 Jun. 27, 2013

Related U.S. Application Data

(60) Division of application No. 13/185,546, filed on Jul. 19, 2011, now Pat. No. 8,404,054, which is a continuation of application No. 12/959,651, filed on Dec. 3, 2010, now Pat. No. 8,043,437.

(51) Int. Cl.
*A47L 15/00* (2006.01)
*A47L 15/42* (2006.01)

(52) U.S. Cl.
CPC ............ *A47L 15/4248* (2013.01); *Y02B 40/46* (2013.01); *A47L 15/4291* (2013.01); *A47L 2501/02* (2013.01); *A47L 2401/10* (2013.01); *A47L 15/0084* (2013.01); *A47L 15/4244* (2013.01); *A47L 2501/03* (2013.01)

USPC ............... 134/25.2; 134/26; 134/36; 134/18; 134/56 D; 134/60

(58) Field of Classification Search
CPC ............ A47L 15/0047; A47L 15/4291; A47L 15/4297
USPC .......................... 134/25.2, 56 D, 57 D, 60, 26
See application file for complete search history.

(56) References Cited

U.S. PATENT DOCUMENTS

| | | | | |
|---|---|---|---|---|
| 3,586,011 | A * | 6/1971 | Mazza | 134/57 D |
| 4,076,146 | A * | 2/1978 | Lausberg et al. | 222/52 |
| 6,244,277 | B1 * | 6/2001 | Maunsell | 134/60 |
| 2002/0088502 | A1 * | 7/2002 | Van Rompuy et al. | 141/1 |
| 2008/0184746 | A1 * | 8/2008 | Agarwal | 68/12.02 |

FOREIGN PATENT DOCUMENTS

| | | |
|---|---|---|
| DE | 1453070 A | 3/1969 |
| DE | 9416710 U1 | 12/1994 |
| DE | 602004001212 T2 | 7/2007 |
| WO | 2008148400 A1 | 12/2008 |

OTHER PUBLICATIONS

German Search Report for Counterpart DE102011054150, Sep. 16, 2013.

* cited by examiner

*Primary Examiner* — Michael Barr
*Assistant Examiner* — Caitlin N Dunlap

(57) ABSTRACT

A method of operating a dishwasher having multiple wash chambers, with each wash chamber executing a different cycle of operation, and liquid from one chamber may be reused in the other chamber.

11 Claims, 4 Drawing Sheets

DISHWASHER WITH MULTIPLE TREATING CHAMBERS

CROSS-REFERENCE TO RELATED APPLICATION

This application is a divisional of U.S. patent application Ser. No. 13/185,546, filed Jul. 19, 2011, which application is a continuation of U.S. patent application Ser. No. 12/959,651, filed Dec. 3, 2010, now U.S. Pat. No. 8,043,437 both of which are incorporated herein by reference in their entirety.

BACKGROUND OF THE INVENTION

Dishwashers can include multiple compartments in the form of multiple drawers or pull-out compartments slidably mounted in a cabinet. Each compartment can include a tub defining a treating chamber. Typically, a dish rack is provided in each treating chamber to support utensils during a treating cycle of operation. Treating liquid may be provided to each of the treating chambers to treat utensils. The treating liquid may be, for example, water, treating chemistry, or a mixture of water and treating chemistry. Some dishwashers may be provided one or more sensors to monitor the soil load in the treating liquid.

BRIEF DESCRIPTION OF THE INVENTION

A method of operating a dishwasher having multiple treating chambers comprises determining which of the multiple treating chambers has the lightest soil load to define a treating chamber with the lightest soil load, implementing a wash cycle selected for the treating chamber with the lightest soil load by supplying a charge of treating liquid to the treating chamber with the lightest load, supplying the treating liquid from the treating chamber with the lightest soil load to another one of the multiple treating chambers, and implementing another wash cycle selected for the another one of the treating chamber using the treating liquid from the treating chamber with the lightest soil load.

DESCRIPTION OF EMBODIMENTS OF THE INVENTION

The invention is generally directed toward sharing treating liquid in a dishwasher having multiple treating chambers. One aspect of the invention is to transfer treating liquid from one treating chamber to another treating chamber to share the treating liquid between multiple treating chambers and conserve resources. Initially, the treating chamber with the lightest soil load may be determined. The treating liquid may be provided to this treating chamber for implementing a wash step of a wash cycle. When the wash step is complete, the treating liquid may be transferred to another treating chamber having heavier soil load for a use in a wash step of a wash cycle. Additionally, it is noted that an excess dose of treating chemistry may cause damage to the utensils in a treating chamber during a wash cycle. The invention addresses problems associated with sharing treating liquid between multiple treating chambers to minimize the use of treating chemistry and water, while maintaining a quality of treatment, and controlling the dose of treating chemistry to prevent any damage to the utensils. For purposes of this description, the term "utensil(s)" is intended to be generic to any item, single or plural, that may be treated in a dishwasher, including, without limitation; dishes, plates, pots, bowls, pans, glassware, and silverware.

Figure 1:
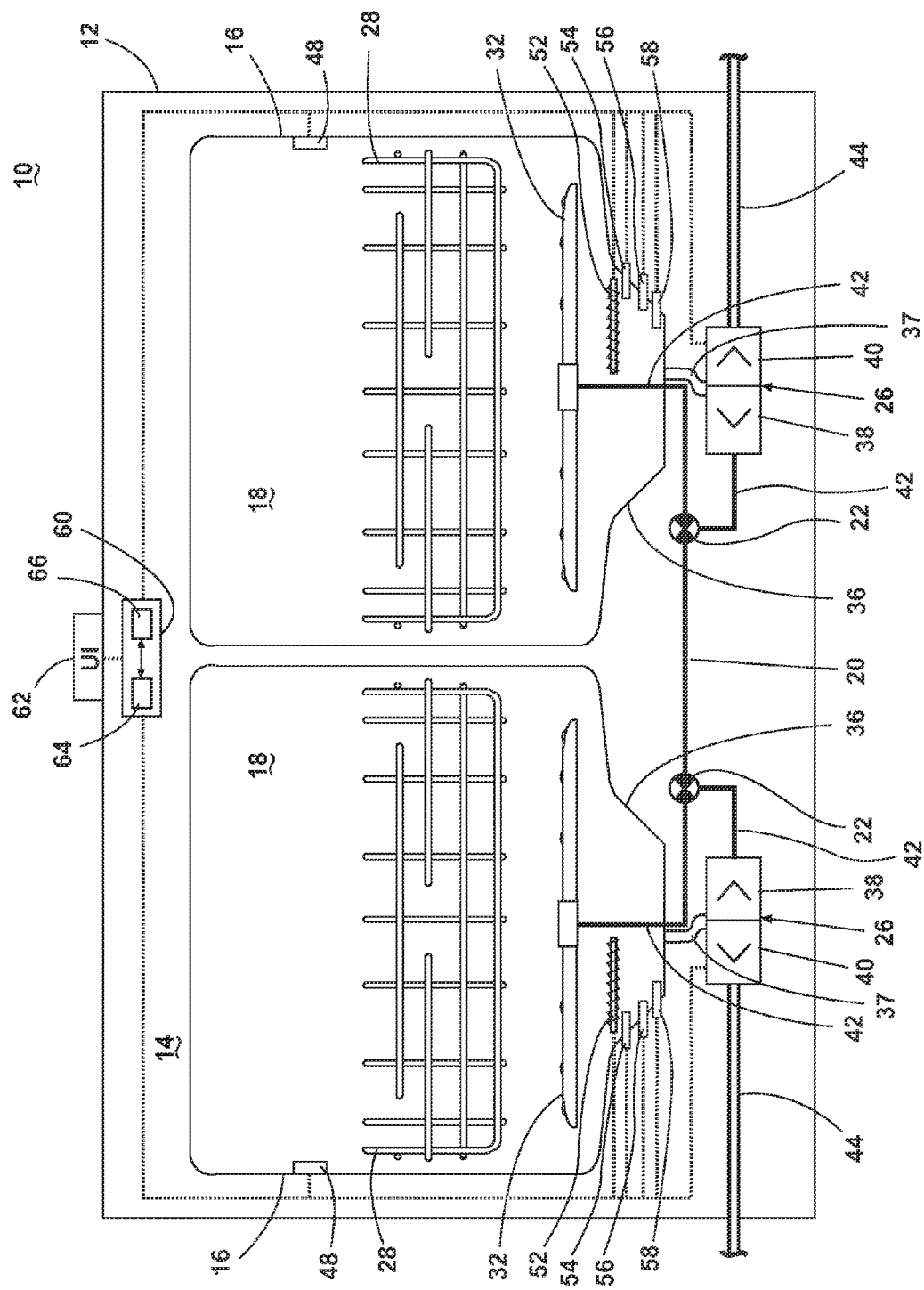
FIG. 1 is a schematic, front view of a first exemplary dishwasher having multiple treating chambers.

FIG. 1 is a schematic, front view of a first exemplary dishwasher 10 having multiple treating chambers. As illustrated, the dishwasher 10 may comprise a cabinet 12 defining an interior 14, which is accessible through a moveable cover, such as a door or drawer (not shown). The cabinet 12 may comprise a chassis or frame to which panels may be mounted. For built-in dishwashers, the outer panels are typically not needed. Multiple wash tubs 16 may be provided within the interior 14 of the cabinet 12. As illustrated, two wash tubs 16 are provided in a side-by-side arrangement. Each wash tub 16 may at least partially define a treating chamber 18 that receives and treats utensils according to a cycle of operation, often referred to a wash cycle. Each wash tub 16 may have optionally an open face (not shown) that is closed by the cover. Alternatively, each wash tub 16 may be provided with an individual cover for closing the open face. Each wash tub 16 may be fluidly connected to each other through an exchange conduit 20 and control valves 22.

Although the dishwasher 10 may be configured to have two wash tubs 16 inside a single cabinet 12, it is noted that many other configurations may be also possible. For example, the dishwasher 10 may include two separate cabinets 12, each having a single wash tub 16. It is also contemplated that more than two wash tubs 16 can be provided for the dishwasher 10. It is also contemplated that wash tubs 16 may be positioned in a side-by-side configuration, as illustrated, a stacked configuration, such as a drawer-type dishwasher, or mixture thereof. Regardless of the number and orientation of the wash tubs 16, the wash tubs 16 will be fluidly connected to each other.

As illustrated, the wash tubs 16 and associated components operably coupled to the wash tubs 16 have similar structures and configurations, either as a whole or on a component basis. Therefore, only one of the wash tubs 16 and associated components will be described unless otherwise required, with the understanding that the description applies to both wash tubs 16.

One or more utensil rack(s) 28 may be provided in the treating chamber 18 for supporting various objects, such as utensils and the like, to be exposed to a wash cycle. The utensil rack 28 may be mounted for sliding movement into and out of the treating chamber 18 through the opening closed by the cover (not shown).

A liquid supply system may be provided for supplying liquid to the treating chamber 18 as part of a wash cycle for washing any utensils within the utensil rack 18. The liquid supply system may include one or more liquid sprayers, which is illustrated in the form of a spray arm assembly 32 that is provided within the treating chamber 18. The spray arm assembly 32 is positioned in the wash tub 16 beneath the utensil rack 28 and configured to rotate in the treating chamber 18 to generate a spray of treating liquid in a generally upward direction, over a portion of the interior of the respective treating chamber 18, typically directed to treat utensils located in the utensil rack 28. While the spray arm assembly 32 is illustrated as a rotating spray arm, the spray arm assembly 32 can be of any structure and configuration, such as fixed spray heads. Additional spray arms or nozzles can also be provided.

The liquid supply system further comprises a lower tub region or sump 36 which collects treating liquid sprayed within the treating chamber 18. The sump 36 is illustrated as being formed with or affixed to a lower portion of the wash tub 16 to collect treating liquid that may be supplied into or circulated in the wash tub 16 during, before or after a cycle of operation. Alternatively, the sump 36 may be remote from the wash tub 16 and fluidly coupled to the wash tub 16 by suitable fluid conduits.

The liquid supply system further comprises a pump assembly 26 fluidly coupled to the sump 36 through an inlet 37 to receive liquid from the sump 36. The pump assembly 26 may have both a recirculation pump 38 and a drain pump 40. The recirculation pump 38 fluidly couples the sump 36 to the spray arm assembly 32 through a spray arm supply conduit 42 such that the recirculation pump 38 can selectively pump treating liquid that collects in the sump 36 to the spray arm assembly 32. In this way, the recirculation pump 38 can redistribute treating liquid collecting in the sump 36 through the spray arm assembly 32 into the treating chamber 18, where the liquid naturally flows back under the force of gravity to the sump 36 for recirculation or drainage, depending on the phase or step of the wash cycle. The drain pump 40 fluidly couples the sump 36 to a drain conduit 44 and may be used to drain treating liquid from the sump 36, through the drain conduit 44, and out of the dishwasher 10, such as to a household drain, a sewer line, or the like.

The spray arm supply conduit 42 may be fluidly coupled to the exchange conduit 20 through a control valve 22 which selectively places the sump 36 in fluid communication with the pump assembly 26 or with the exchange conduit 20.

Treating liquid from one treating chamber 18 can be transferred to the other treating chamber 18 by controlling the control valves 22. For example, the control valves 22 and the operation of one of the recirculation pumps 38 may be configured to direct the flow to the sprayer in the other chamber to transfer the fluid between chambers 16. In one embodiment, the control valves 22 may be a single valve.

A chemistry dispenser 48 may be provided for dispensing a treating chemistry, which can include detergent and/or rinse aid, into the treating chamber 18. As illustrated, the chemistry dispenser may be located on a side wall of the wash tub 16. Alternatively, the chemistry dispenser 48 may be located anywhere inside the wash tub 16 or in the cover (not shown). It will be understood that depending on the type of dishwasher and the type of treating chemistry used, the chemistry dispenser 48 may be incorporated into one dispensing mechanism. The chemistry dispenser 48 may be of a single-use dispenser, which stores a single dose of treating chemistry, or a bulk dispenser, which stores multiple doses of treating chemistry. In the case of bulk dispensing, the treating chemistry can be selectively dispensed into the treating chamber 18 in a regulated quantity and at a predetermined time or multiple times during a cycle of operation. A common chemistry dispenser is a single-use dispenser mounted to an inside surface of a door or a front wall of a drawer. The dispenser has a door that automatically opens during a washing phase.

The dishwasher 10 further comprises a heater 52 that may be located within the sump 36 to selectively heat liquid collected in the sump 36. The heater 52 may be an immersion heater in direct contact with treating liquid in the sump 36 to provide the liquid with predetermined heat energy. The heater 52 may also be employed to heat air in the treating chamber 18, such as for a heated drying step of a cycle of operation. Alternately, a separate heater (not shown) can be provided for heating air. A temperature sensor such as a thermistor 54 may also be positioned in the sump 36 to provide an output signal that is indicative of the temperature of any fluid, including treating liquid or air, in the sump 36. A pH sensor 56 may also be positioned in the sump 36 to provide an output signal indicative of the pH of the treating liquid in the sump 36. A turbidity sensor 58 may also be positioned in the sump 36 to provide an output signal that is indicative of the turbidity of the treating liquid in the sump 36.

The dishwasher 10 further comprises a controller 60 for implementing one or more cycles of operation. The dishwasher 10 may be preprogrammed with a number of different cleaning cycles from which a user may select one cleaning cycle to clean a load of utensils. Examples of cleaning cycles include normal, light/china, heavy/pots and pans, and rinse only. As illustrated, a single controller 60 may be provided for both treating chambers 18, and may be operably coupled to various components of the dishwasher 10 to implement a wash cycle in one or both of the treating chambers 18. For example, the controller 60 may be coupled with the recirculation pumps 38 for circulation of liquid in the wash tubs 16 and the drain pumps 40 for drainage of liquid from the wash tubs 16. The controller 60 may also be coupled with the heater 52 to heat the liquid and/or air depending on the step being performed in the cycle of operation. The controller 60 may also be coupled to the chemistry dispensers 48 to dispense a treating chemistry during a wash step and/or rinse step of a cycle of operation. The controller 60 may also be coupled to the thermistor 54, pH sensor 56, and a turbidity sensor 58 to either control these sensors and/or receive their output signal for use in controlling the components of the dishwasher 10. The controller 60 may also be coupled to the control valves 22 for selectively transferring treating liquid from one treating chamber 18 to another treating chamber 18.

A control panel or user interface 62 for use in selecting a wash cycle can be provided on the dishwasher 10 and coupled to the controller 60. The user interface 62 may receive input from a user for the implementation of a wash cycle and provide the user with information regarding the wash cycle. In this way, the controller 60 can implement a wash cycle selected by a user according to any options selected by the user and provide related information to the user. The user interface 62 may include operational controls such as dials, lights, knobs, levers, buttons, switches, and displays enabling the user to input commands to the controller 60 and receive information about the selected treatment cycle. The user interface 62 may be used to select a treatment cycle to treat a load of utensils. Alternatively, the treatment cycle may be automatically selected by the controller 60 based on the soil levels sensed by any sensors in the dishwasher 10 to optimize the treatment performance of the dishwasher 10 for a particular load of utensils.

The controller 60 may be provided with a memory 66 and a central processing unit (CPU) 64. The memory 66 may be used for storing control software that may be executed by the CPU 64 in completing a cycle of operation using one or both treating chambers 18 of the dishwasher 10 and any additional software. For example, the memory 66 may store one or more pre-programmed cycles of operation that may be selected by a user and completed in one of the treating chambers 18. A cycle of operation for the treating chambers 18 may include one or more of the following steps: a wash step, a rinse step, and a drying step. The wash step may further include a pre-wash step and a main wash step. The rinse step may also include multiple steps such as one or more additional rinsing steps performed in addition to a first rinsing. The amounts of water and/or rinse aid used during each of the multiple rinse steps may be varied. The drying step may have a non-heated drying step (so called "air only"), a heated drying step or a combination thereof. These multiple steps may also be performed within the treating chambers 18 in any desired combination.

Figure 2:
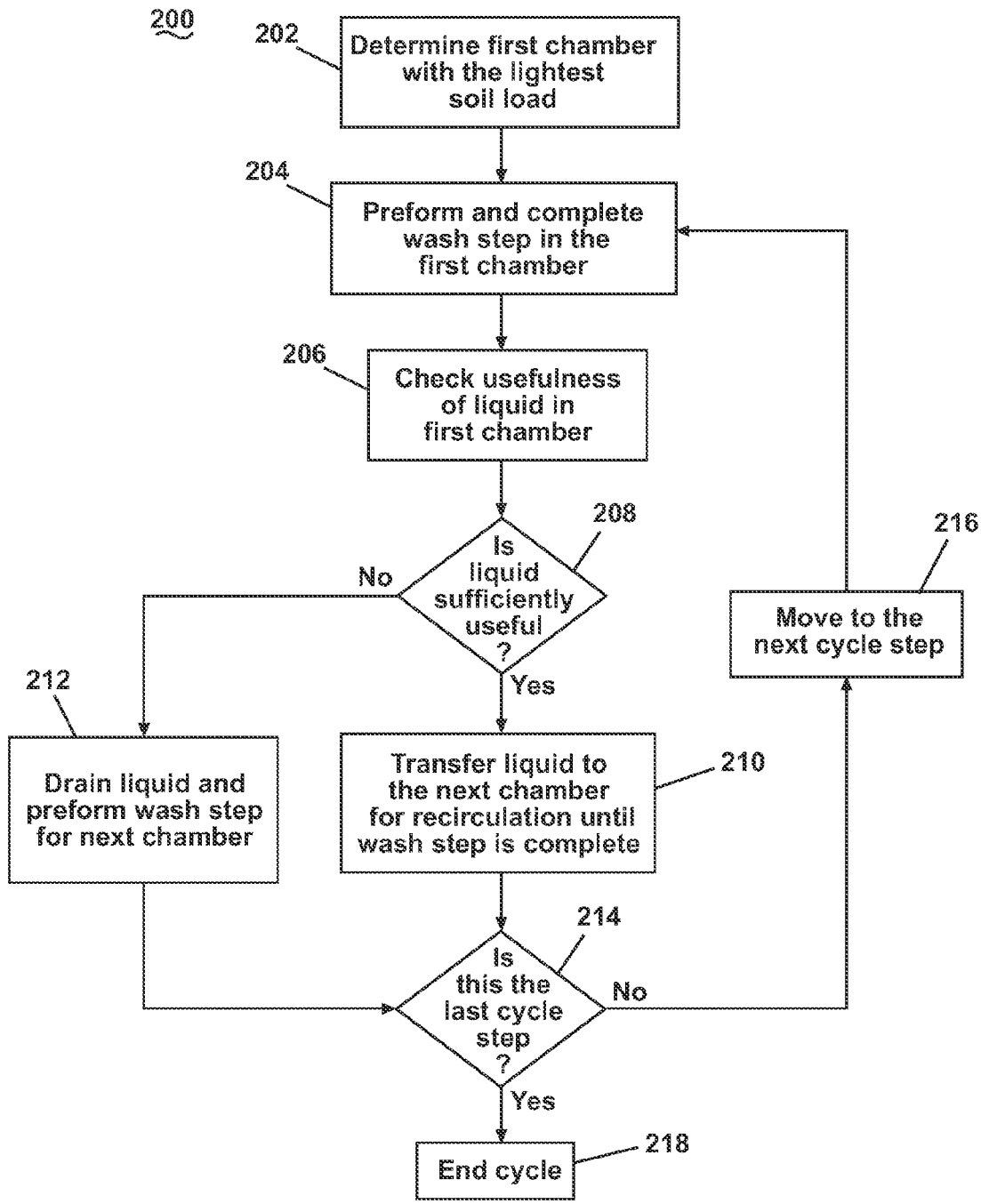
FIG. 2 is a flow chart showing a method of operating the dishwasher of FIG. 1 according to a first embodiment of the invention.

FIG. 2 is a flow chart showing a method 200 of operating the dishwasher of FIG. 1 according to an embodiment of the invention. The sequence of steps depicted is for illustrative purposes only, and is not meant to limit the method 200 in any way as it is understood that the steps may proceed in a different logical order or additional or intervening steps may be included without detracting from the invention. The method 200 may be implemented independently or as a part of a wash cycle, such as a pre-wash, wash, rinse, or dry step. The method 200 assumes that utensils are provided in each treating chamber 18 of the dishwasher 10 for treatment, and that the dishwasher 10 has two treating chambers 18. However, the method 200 may be implemented by a dishwasher having a configuration other than the configuration shown in FIG. 1. The method 200 also assumes that the wash cycles for the two treating chambers 18 are configured to use the same treating chemistry.

At 202, a determination is made as to which treating chamber 18 has the lightest soil load. The soil load is an amount or level of soil for a load of utensils within a treating chamber 18. Therefore, the treating chamber 18 with the lightest soil load will be the treating chamber with the load of utensils having the least amount or lowest level of soil. Determining the treating chamber 18 with the lightest soil load may be accomplished in different ways. In one example, the determination may be a user input. The user may visually evaluate and/or compare the load of utensils in each treating chamber 18 when the user places the utensils in each treating chamber 18. The user may then manually designate one treating chamber having the lighter soil load through the user interface 62. It can also be done inferentially by the controller based on the cycle of operation selected by the user for each treating chamber. For example, the controller may have a table of data ranking, based on anticipated soil load levels, the different cycles of operation that the user may select and automatically assign as the lighter load chamber, the chamber having the cycle with the anticipated lighter soil load. For example, if the cycle for one chamber is a Heavy Duty cycle and the other is a Normal cycle, it will be anticipated that the chamber with the Normal cycle will be have the lighter soil load. Similarly, if Normal and China cycles are selected, it is anticipated that the chamber with the China cycle will have the lighter soil load. Alternatively, after placing the utensils in each treating chamber 18, the soil loads may be sensed using any suitable method. For example, an optical sensor, such as a camera sensor may monitor the arrangement and location of the utensils in each wash tub 16 to determine which of the wash tub 16 has the lightest soil load based on the number and types of utensils. Alternatively, the camera sensor may be used to determine the amount of soils on the utensils in addition to the type and amount of utensils. Liquid may also be sprayed within each of the treating chambers and the corresponding turbidity of the liquid sensed and compared to determine which of the chambers has the lightest soil load. For the purposes of the description of the method 200, the treating chamber 18 has the lightest soil load will be referred to as the first treating chamber 18 and the other treating chamber 18 will be referred to as the second treating chamber 18.

At 204, a wash step of the wash cycle may be implemented in the first treating chamber 18. The wash step includes supplying treating liquid to the treating chamber 18. The treating liquid can be sprayed onto the utensils in the utensil rack 28 from the spray arm assembly 32. The treating liquid may be recirculated through the treating chamber 18 one or more times by the recirculation pump 38. Treating chemistry can optionally be dispensed from the chemistry dispenser 48. During 204, the wash cycle in the second treating chamber 18 may not be initiated until the wash cycle in the first treating chamber 18 is complete.

At 206, the usefulness of the treating liquid in the first treating chamber 18 may be checked. As used herein, the usefulness may include the amount of available detergent, available enzyme load, pH, soil load, turbidity, and temperature profile. This may be done after the wash step in the first treating chamber 18 is complete. The usefulness may be monitored using sensors provided in the dishwasher 10, such as the pH sensor 56, the turbidity sensor 58, or another chemical sensor (not shown). For example, the pH sensor 56 may monitor the pH of the treating liquid in the first treating chamber 18. It is noted that the pH of treating liquid having treating chemistry tends to decrease as the treating liquid is repeatedly recirculated, and the treating liquid may not be effective in removing soils when the pH of the treating liquid drops down below a predetermined pH threshold.

Similar to the usefulness of the treating liquid, a cleaning action of the treating liquid may be determined. Cleaning action could be measured or estimated by determining the type and concentration of the detergent used in the treating liquid, the softness of the water used in the treating liquid, the amount of soils present in the treating liquid, as well as the temperature profile of the treating liquid. The cleaning action may also be determined by a look-up table having at least one of concentration, temperature, pH of the treating liquid, water hardness and soil level, which may be sensed by a suitable sensor. In some instances, the amount of cleaning action may be great enough to undesirably alter, temporarily or permanently, a physical characteristic of the utensils. For example, it is known that glasses are prone to chemical etching when in the presence of high temperature, high pH, and high concentrations of builder chemistry, with one example of a builder chemistry being phosphate. A lookup table of cleaning action based on the above factors could be used to determine if the cleaning action is below a threshold that would make it safe to use in a given wash step. In general, there is a proportional relationship for cleaning action and detergent concentration, treating liquid temperature, and pH. In general, there is an inverse relationship for cleaning action and water hardness and soil levels The output signal from the pH sensor 56 and/or the turbidity sensor 58 may be sent to the controller 60, where the output signal may be compared to reference data stored in the memory 66, and the determination as to the usefulness of the treating liquid may be made at 208. The reference data can include values or ranges of values corresponding to pH and turbidity that are considered sufficient for use in another wash cycle and/or values or ranges of values corresponding to pH and turbidity that are considered insufficient for use in another wash cycle.

If the usefulness of the treating liquid is determined to be sufficiently useful at 208, the treating liquid may be transferred to the second treating chamber 18 through the exchange conduit 20 and the control valves 22 and a wash step of the wash cycle may be implemented in the second treating chamber 18 at 210.

If the usefulness of the treating liquid is not determined to be sufficiently useful at 208, the treating liquid in the first treating chamber 18 may be drained from dishwasher 10 by the drain pump 40 at 212. Further, fresh or new treating liquid may be provided directly to the second treating chamber 18 to implement a wash step according to the wash cycle for the second treating chamber 18.

From either 210 or 212, after the wash step in the second treating chamber 18 is complete, the controller 60 may make a determination at 214 if the wash step just completed in the second treating chamber 18 is the last step to be completed in both wash cycles for the first and second treating chambers 18. If the wash step just completed in the second treating chamber 18 at 210 or 212 is not the last step in both wash cycles, a next cycle step may be implemented at 216, and steps 204 to 214 of the method 200 may be repeated until it is determined at 214 that the wash cycles are complete at 218.

While the method 200 illustrates one example of operating the dishwasher 10, other examples of operating a dishwasher in accordance with the invention may be also possible. For example, the sequence of the wash/rinse steps in a wash cycle may be modified by the frequency of monitoring of the soil load. The following alternative examples of the method 200 assume that the dishwasher 10 has two treating chambers 18:

Example 1

The method 200 can be performed without checking the usefulness of the treating liquid at 206. Rather, the treating liquid may be transferred alternatively between the two treating chambers 18 until the wash and/or rinse steps of both wash cycles are complete, such that the operation of the dishwasher 10 may be performed in the order of first treating chamber, second treating chamber, first treating chamber, second treating chamber, etc.

Example 2

The method 200 can include determining the treating chamber 18 with the lightest soil load multiple times during the wash cycles for the two treating chambers 18. The soil load of the treating chambers 18 may be monitored, such as by the turbidity sensor, multiple times during their respective wash cycles, for example, to determine which treating chamber 18 has the lightest soil load at the end of each wash step and/or rinse step of the wash cycle. For example, upon completion of a wash step in the first treating chamber 18 having the lightest soil load, the treating liquid may be transferred to the second treating chamber 18 having a heavier soil load for completion of a wash step. The increase in the soil load for each treating chamber 18 during the wash step may be monitored using sensors, such as by the increase in turbidity. The treating liquid may then next be used in the treating chamber 18 having the least soil load increase during the wash step. In other words, if the soil load increase in the first treating chamber 18 is less than the second treating chamber 18, the treating liquid may be transferred to the first treating chamber 18. If the soil load increase in the second treating chamber 18 is less than the first treating chamber 18, the treating liquid may remain in the second treating chamber 18 to implement next wash step or rinse step. A series of determining steps may iterate to determine where the treating liquid should be used to best retain the usefulness of the treating liquid until the wash cycles are completed for both treating chambers 18. It is noted that the determining steps may be selectively implemented during a cycle of operation.

Figure 3:
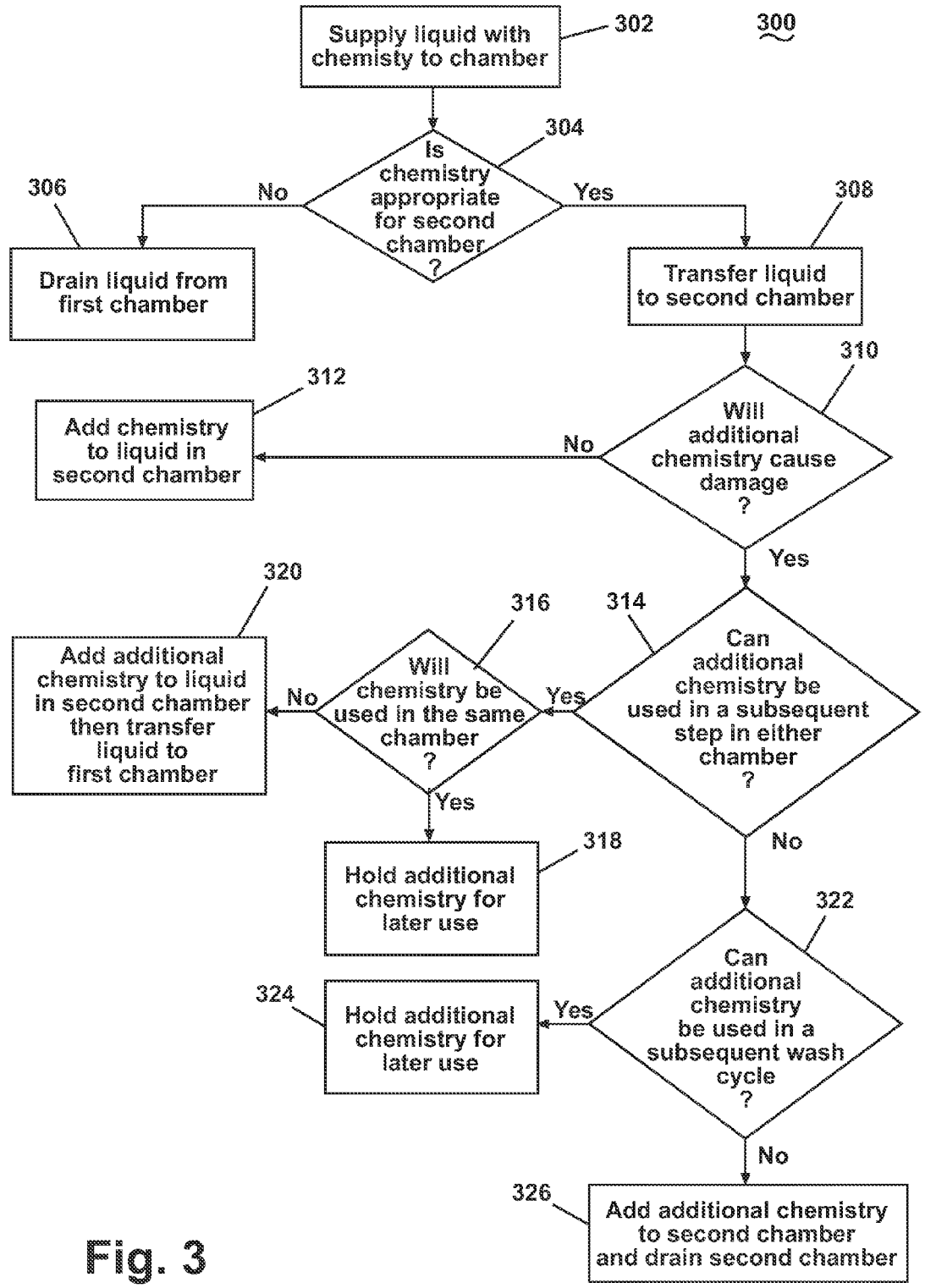
FIG. 3 is a flow chart showing a method of operating the dishwasher of FIG. 1 according to a second embodiment of the invention.

FIG. 3 is a flow chart showing a method 300 of operating the dishwasher 10 of FIG. 1 according to a second embodiment of the invention. In general, the method 300 is directed to using controlled amount of treating chemistry in the dishwasher 10 to minimize any potential damage to the utensils in the treating chambers 18 from too much treating chemistry. The sequence of steps depicted in method 300 is for illustrative purposes only, and is not meant to limit the method 300 in any way as it is understood that the steps may proceed in a different logical order or additional or intervening steps may be included without detracting from the invention. The method 300 may be implemented independently or as a part of a wash, such as a pre-wash, wash, rinse, or dry phase. The method 300 assumes that the dishwasher 10 includes two treating chambers 18, and also assumes that utensils are provided to each treating chamber 18 for treatment. The method 300 further assumes that one treating chamber 18 is to be provided with treating liquid first to implement a wash cycle; for the purposes of the description of the method 300, this treating chamber 18 will be referred to as the first treating chamber 18 and the other treating chamber 18 will be referred to as the second treating chamber 18.

At 302, treating liquid that includes a treating chemistry is supplied to the first treating chamber 18. The treating liquid may include a mixture of water and the treating chemistry, such as a detergent-water solution. The supply of treating liquid may be done as part of a wash step in a wash cycle. The treating liquid can be sprayed onto the utensils in the utensil rack 28 from the spray arm assembly 32. The treating liquid may be recirculated through the treating chamber 18 one or more times by the recirculation pump 38. Treating chemistry can be dispensed from the chemistry dispenser 48.

At 304, a determination is made as to whether the treating chemistry in the treating liquid used for the first treating chamber 18 at 302 is suitable to use in the second treating chamber 18. For example, the amount or concentration of detergent used for the first treating chamber, such as when running a Heavy Duty cycle, may be great enough to chemically mark the utensils in the second treating chamber, such when running a China cycle. The risk of chemical marking may be exacerbated if the treating chemistry in the chemistry dispenser 48 for the second treating chamber 18 is released and further increases the amount or concentration of the treating chemistry in the liquid from the first treating chamber 18. The determination at 304 aids in identifying this possible risk. The determination at 304 may be based on the type of treating chemistry, the amount of treating chemistry, the concentration of treating chemistry, and/or the pH of the treating liquid. One or more sensors coupled to the chemistry dispenser 48 or the sump 36 of the first treating chamber 18 may send an output signal to the controller 60 indicating the type and/or pH of the treating chemistry. Alternatively, the type of treating chemistry may be identified by the user based on indicia on a cartridge holding the treating chemistry in the chemistry dispenser 48 and inputted via the user interface 62. Alternatively, the controller 60 may be configured to detect the cartridge and determine the type of treating chemistry from the cartridge.

If the treating chemistry in the first treating chamber 18 is not suitable for use in the second treating chamber 18, the treating liquid may be drained at 306. Fresh or new treating liquid may be supplied to the second treating chamber 18 before implementing a wash step in the second treating chamber 18.

If the treating chemistry in the first treating chamber 18 is suitable for use in the second treating chamber 18, the treating liquid may be transferred from the first treating chamber 18 to the second treating chamber 18 at 308.

Upon transferring the liquid to the second treating chamber 18, it may be determined at 310 if the addition of more treating chemistry, such as any treating chemistry stored in the chemistry dispenser 48 of the second treating chamber 18, to the treating liquid would result in damage to the utensils in the second treating chemistry. Treating chemistry such as detergent may have high pH, which may be a source of chemical-attack, such as chemical marking, on and etching of utensils, especially utensils comprising glass, such as some cups or china. The rate of etching or marking may be accelerated when combined with an increased temperature, such as a hot water wash and/or rinse step during the wash cycle. Therefore, etching may be reduced by dispensing an optimum amount of treating chemistry to the second treating chamber 18.

The determination at 310 may be based both on the amount of treating chemistry in the chemistry dispenser 48 of the second treating chamber 18, the amount of treating chemistry in the treating liquid from the first treating chamber 18, and information specific to the load of utensils in the second treating chamber 18. The amount of the treating chemistry in the dispenser 48 of the second treating chamber 18 may be known from the dose size of the chemistry dispenser 48. The amount of the treating chemistry in the treating liquid from the first treating chamber 18 may be known from the dose size of the chemistry dispenser 48 in the first treating chamber 18 or from the wash cycle run in the first treating chamber 18. Alternatively, a more precise amount of treating chemistry in the treating liquid, which may effectively participate in the enzyme reaction with soil, may be calculated by a chemical sensor, such as the pH sensor 56 or a surface acoustic wave (SAW) sensor, in the first or second treating chamber 18, and an output signal corresponding to the pH or concentration of treating chemistry may be sent to the controller 60. Information (turbidity, soil load, etc.) specific to the load of utensils in the second treating chamber 18 may be collected using any of the previously described methods/sensors before or during the wash/rinse step. Once all of the information is collected, the controller 60 can run one or more algorithms to determine if adding the treating chemistry in the chemistry dispenser 48 of the second treating chamber 18 to the treating liquid from the first treating chamber may likely cause damage to the utensil load in the second treating chamber 18.

If it is determined that adding the treating chemistry in the chemistry dispenser 48 of the second treating chamber 18 to the treating liquid is not likely to cause damage to the utensils, the treating chemistry in the chemistry dispenser 48 may be provided to the treating liquid at 312.

If it is determined that adding the treating chemistry in the chemistry dispenser 48 of the second treating chamber 18 to the treating liquid is likely to cause damage to the utensils, it is determined at 314 if the treating chemistry in the chemistry dispenser 48 of the second treating chamber 18 can be dispensed in a subsequent wash and/or rinse step. For example, it can be determined at 314 if the treating chemistry in the chemistry dispenser 48 is needed for a subsequent wash step in either of the treating chambers 18. The determination may be based on a comparison of the wash cycles for the two treating chambers 18.

If the additional treating chemistry is determined to be useable in at least one of the treating chambers 18, it is determined at 316 if the additional treating chemistry may be used in the second treating chamber 18. Again, the determination may be based on a comparison of the wash cycles for the two treating chambers 18. If it is determined that the additional treating chemistry may be used in a subsequent wash step in the second treating chamber 18, at 318 the additional treating chemistry may be held in the chemistry dispenser 48 of the second treating chamber 18 for later use. For example, the dispensing cartridge in the chemistry dispenser 48 of the second treating chamber 18 may store and hold the treating chemistry until the treating chemistry may be dispensed in the subsequent wash step.

If it is determined at 316 that the additional treating chemistry will be used in the first treating chamber 18, the treating chemistry may be added to treating liquid in the second treating chamber 18 before being transferred to the first treating chamber 18 in 320. This may be delayed until the dishwasher is ready to commence the wash step in the first treating chamber 18. In this case, the second treating chamber 18 may be emptied before supplying fresh or new water and adding the treating chemistry from the chemistry dispenser 48. Otherwise, the treating chemistry can be added to existing treating liquid in the second treating chamber. Therefore the wash step in the first treating chamber 18 may be postponed until the wash step in the second treating chamber 18 is completed.

If it is determined at 314 that the treating chemistry in the chemistry dispenser 48 of the second treating chamber 18 cannot be used in a subsequent wash step in either treating chamber 18, it may then be determined at 322 whether if the treating chemistry can be used in the second treating chamber 18 in a subsequent wash cycle. A subsequent wash cycle may be implemented in the second treating chamber 18 after a short period of time, such as less than one hour, or after an extended period of time, such as in couple days, depending on the user. If the user plans to dispense and use the treating chemistry in a subsequent wash cycle, the treating chemistry may be stored in the chemistry dispenser 48 for later use at 324. However, if a cycle of operation is not to be implemented for an extended time period, for example, a month, the treating chemistry may be dispensed to the second treating chamber 18 and drained from the dishwasher 10 at 326. In making the determination at 322 whether the additional treating chemistry can be held for later use at 324 or drained at 326, other parameters such as the effect of humidity on the treating chemistry and frequency of dishwasher operation may be considered by the controller 60.

Figure 4:
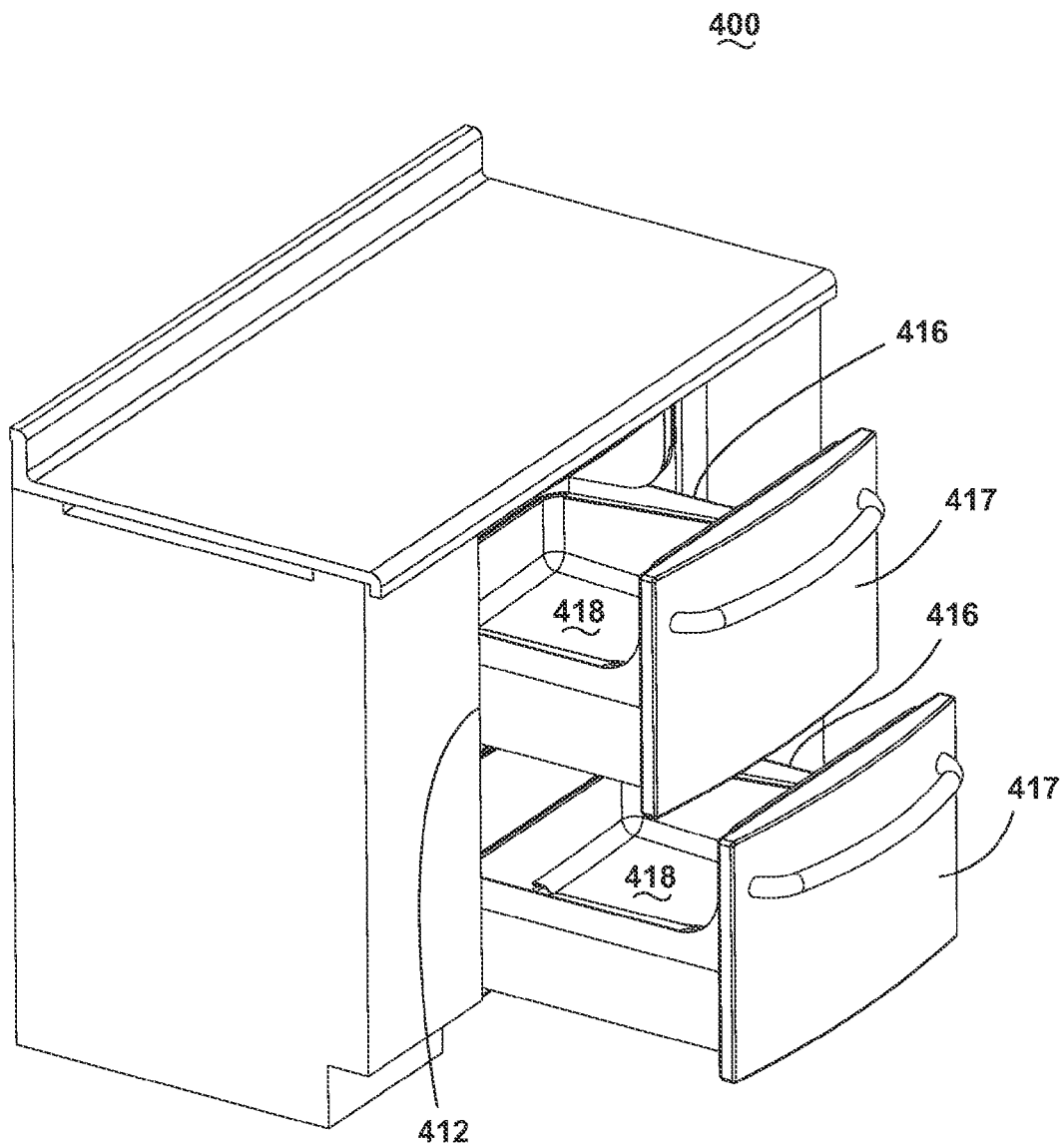
FIG. 4 is a schematic, perspective view of a second exemplary dishwasher having multiple treating chambers in the form of a drawer-type dishwasher.

FIG. 4 is a schematic, perspective view of a second exemplary dishwasher 400 having multiple treating chambers in the form of a drawer-type dishwasher 400. The methods 200, 300 disclosed herein may be carried out by the dishwasher 400. As illustrated, the dishwasher 400 may include a single cabinet and two wash tubs 416, such as an upper wash tub 416 and a lower wash tub 416, each at least partially defining a treating chamber 418. Each wash tub 416 can be at least partially defined by a drawer 417 slidably supported within the cabinet 412 for movement between an open position, shown, and a closed position, not shown. It is noted that the dishwasher 400 may include one or more components not shown in FIG. 4. For example, each of the treating chambers 418 may be provided with a liquid supply system and controller similar to those described above for FIG. 1. The two treating chambers 418 are fluid connected to each other to selectively transfer liquid between the two treating chambers 418.

The invention described herein provides methods for operating a dishwasher having multiple treating chambers. The methods of the invention can advantageously be used to reuse treating liquid in another wash step or optimize the dose of treating chemistry for the utensils in each treating chamber.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. In a dish washing system having at least two, independently-operable treating chambers, each having a user-filled detergent cup, and in each of which separate user-selected wash cycles are implemented, a method of sharing a wash liquid comprising a solution of detergent and water between the treating chambers during the implementation of the wash cycles, comprising:
   a) determining that a detergent concentration of the wash liquid in one of the wash cycles is below a detergent concentration threshold for an other of the wash cycles; and
   b) supplying the wash liquid to an other treating chamber in which the other of the wash cycles is implemented, for use in the other of the wash cycles, when the detergent concentration of the wash liquid is below the detergent concentration threshold.

2. The method of claim 1 wherein the determining whether a detergent concentration of the wash liquid in the one of the wash cycles satisfies the detergent concentration threshold for the other of the wash cycles comprises determining the detergent concentration of the wash liquid in the one of the wash cycles based on a user selected cycle information.

3. The method of claim 1, further comprising confirming the detergent concentration of the wash liquid by utilizing a sensor selected from the group consisting of: a pH sensor, a turbidity sensor, and a chemical sensor.

4. The method of claim 1, further comprising dispensing detergent from the detergent cup of the other treating chamber in which the other of the wash cycles is implemented.

5. The method of claim 4 wherein the dispensing is delayed for a predetermined time.

6. The method of claim 5 wherein the predetermined time is set such that a cleaning action of the wash liquid remains below a predetermined threshold and is determined based on at least one of: concentration of detergent in the wash liquid, temperature of the wash liquid, pH of the wash liquid, water hardness, and soil level of utensils in the other treating chamber.

7. The method of claim 6 wherein the cleaning action of the wash liquid is determined using at least one of: a pH sensor, a turbidity sensor, a temperature sensor, a timing sensor, and a conductivity sensor.

8. The method of claim 1, further comprising refraining from dispensing detergent from the detergent cup of the other treating chamber in which the other of the wash cycles is implemented until the wash liquid is drained from the other treating chamber.

9. The method of claim 8, further comprising removing the dispensed detergent from the other treating chamber in which the other of the wash cycles is implemented.

10. The method of claim 9 wherein the removing the dispensed detergent comprises draining the dispensed detergent from the other treating chamber in which the other of the wash cycles is implemented.

11. The method of claim 1 wherein the dish washing system further comprises a common chassis and the at least two, independently-operable treating chambers are provided within the common chassis.

* * * * *